United States Patent [19]
Barthelemy et al.

[11] Patent Number: 5,969,333
[45] Date of Patent: Oct. 19, 1999

[54] DATA COLLECTION SYSTEM FOR CARD READERS

[75] Inventors: Serge Barthelemy, Aix-en-Provence; Stéphane Vaudandaine, Gemenos; Michel Leduc, Trets, all of France

[73] Assignee: Gemplus, Gemenos, France

[21] Appl. No.: 08/952,147

[22] PCT Filed: Apr. 4, 1996

[86] PCT No.: PCT/FR96/00517

§ 371 Date: Feb. 4, 1998

§ 102(e) Date: Feb. 4, 1998

[87] PCT Pub. No.: WO96/31842

PCT Pub. Date: Oct. 10, 1996

[30] Foreign Application Priority Data

Apr. 5, 1995 [FR] France .................................. 95 03976

[51] Int. Cl.$^6$ .................................................. G06K 19/06
[52] U.S. Cl. .......................................... 235/492; 439/76.1
[58] Field of Search .................................... 235/492, 486, 235/495; 439/76.1, 59, 62, 638

[56] References Cited

U.S. PATENT DOCUMENTS

| | | | |
|---|---|---|---|
| 4,980,856 | 12/1990 | Ueno | 364/900 |
| 5,155,663 | 10/1992 | Harase | 361/395 |
| 5,184,282 | 2/1993 | Kaneda et al. | 235/495 |
| 5,468,947 | 11/1995 | Danielson et al. | 235/472 |
| 5,563,400 | 10/1996 | Le Roux | 235/486 |
| 5,793,989 | 8/1998 | Moss et al. | 395/285 |

FOREIGN PATENT DOCUMENTS

| | | | |
|---|---|---|---|
| 2359562 | 2/1978 | France . | |
| 2698469 | 5/1994 | France . | |
| 0268390 | 11/1990 | Japan | 235/486 |
| 4042050 | 7/1992 | Japan | 235/486 |
| 405242307 | 9/1993 | Japan | 235/486 |

Primary Examiner—Donald Hajec
Assistant Examiner—Diane I. Lee
Attorney, Agent, or Firm—Nilles & Nilles, S.C.

[57] ABSTRACT

Information collection system for card readers having a planar part (1) that can be plugged into a card reader and possesses an ISO type connector (10) for a serial transmission of information, a part (2) having a PCMCIA format connector (20) permitting a parallel transmission of information, and a part (3) having circuits making it possible to store the data received in serial form and retransmit it in parallel form on the PCMCIA connector.

19 Claims, 2 Drawing Sheets

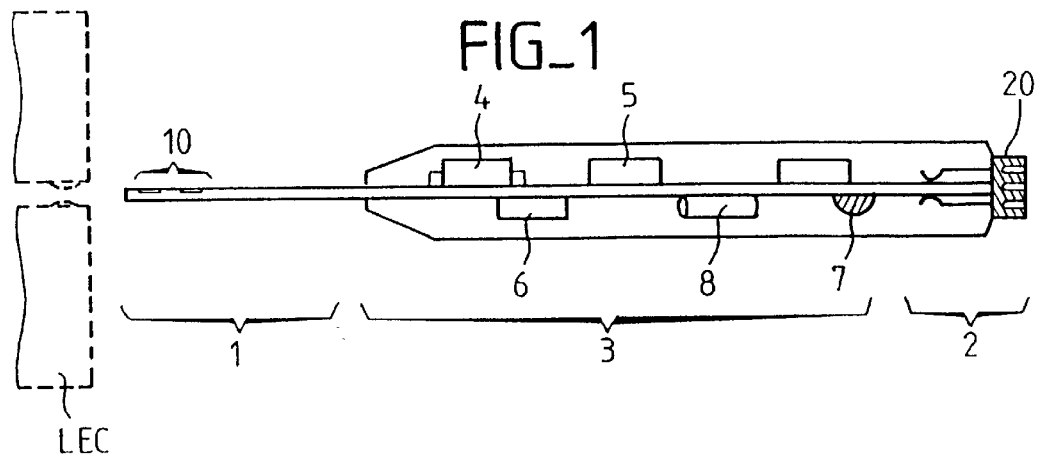
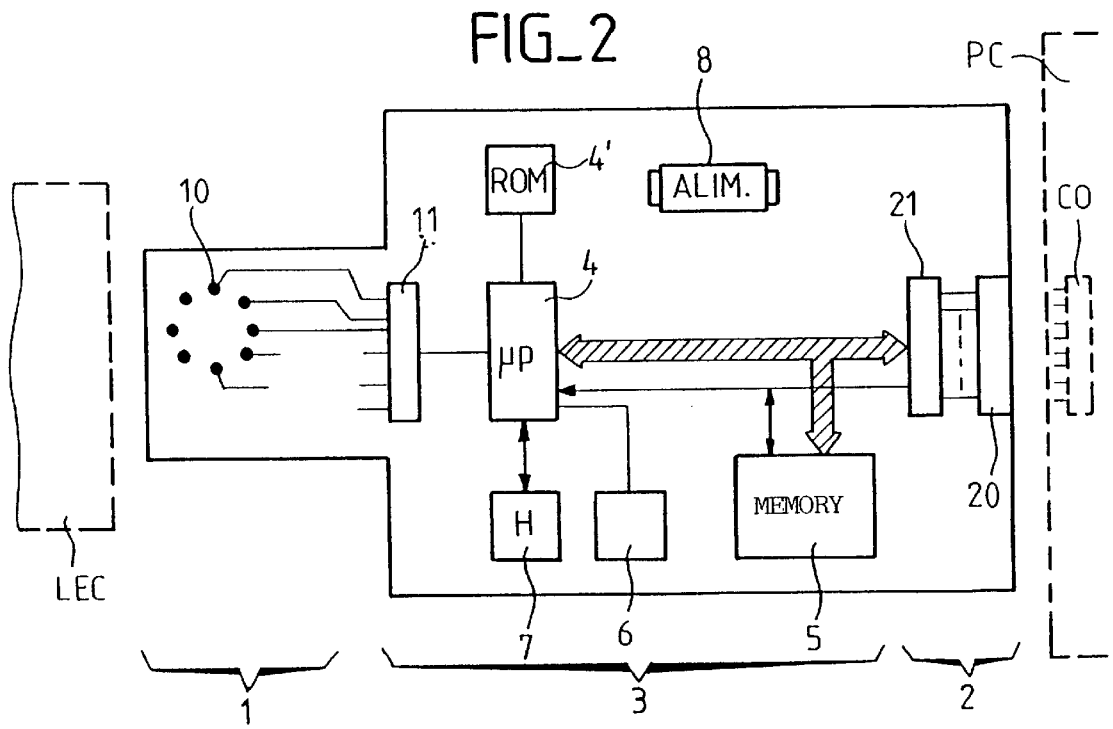
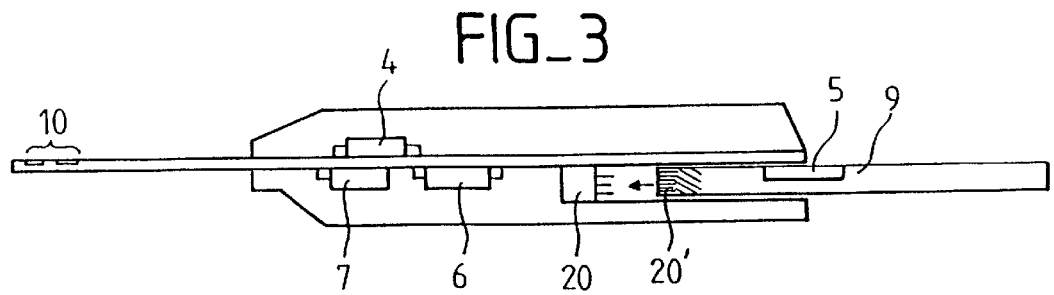

DATA COLLECTION SYSTEM FOR CARD READERS

BACKGROUND OF THE INVENTION

1. Field of the Invention

The invention relates to an information collection system for card readers and especially for chip card readers.

Payment for many services is now done by means of card-based systems, especially chip card systems. Chip card systems often use terminals (card readers) to carry out transactions. These transactions are in general secured with the cards of the system.

The applications of such systems currently lie in the fields of banking, access control, the distribution of power (gas, electricity, etc.), parking meters, games machines, etc. In the majority of these applications, the need to collect information on the transactions made at the terminal is vital for the functioning and security of the system.

However, certain card readers are connected to a central processing system and are known as "on-line" readers while other card readers are isolated and are connected to no other system, and are known as "off-line" readers.

In the "on-line" terminals, the problem of collection is reduced to that of developing suitable software. This is the case for example with bank terminals or card-operated electricity meters which already possess communication means. The transfer of information to the central processing unit can be done either on the initiative of the terminal, or by interrogating the central processing unit.

In terminals known as "off-line" terminals, it is necessary to find a means to transfer the data to a central processing unit. In this case, what has to be done is to collect the data through an operator who will have to set up a connection with the terminal. Here ergonomical considerations, speed of transmission and cost will be essential parameters in the choice of a solution. The solution most usually adopted consists in connecting a portable terminal or a portable PC by means of an RS232 type connection. The main problems then are:

- the making of the connection;
- the reliability of the connection, for this kind of connection system is not designed to permit many connections;
- the cost of the terminal which, for many applications, could prove to be decisive for its use;
- the reliability with which data is transferred to the central processing unit;
- the speed of connection and transfer to the central processing unit.

OBJECTS AND SUMMARY OF THE INVENTION

The invention relates to an approach by which these problems can be resolved.

The invention therefore relates to an information collection system for card readers. This system comprises mainly:

- a part similar to the plug-in part of a chip card, comprising connection zones flush with one face of the card, enabling a serial transmission of information;
- a part comprising a connector enabling a parallel transmission of information;
- an intermediate part interconnecting the connection zones and the connector.

The intermediate portion comprises a memory to store information from one or more card readers. It may also have a control and securing microprocessor. It is also possible to provide for a clock to date the transactions.

BRIEF DESCRIPTION OF THE DRAWINGS

Other characteristics and advantages of the invention shall appear clearly in the following description, given by way of a non-restrictive example, with reference to the appended figures of which:

FIG. 1 shows a sectional view of a first exemplary embodiment according to the invention;

FIG. 2 shows a general diagram of an exemplary embodiment such as that of FIG. 1;

FIG. 3 shows an alternative embodiment of a system according to the invention;

DESCRIPTION OF THE PREFERRED EMBODIMENTS

Figure 4:
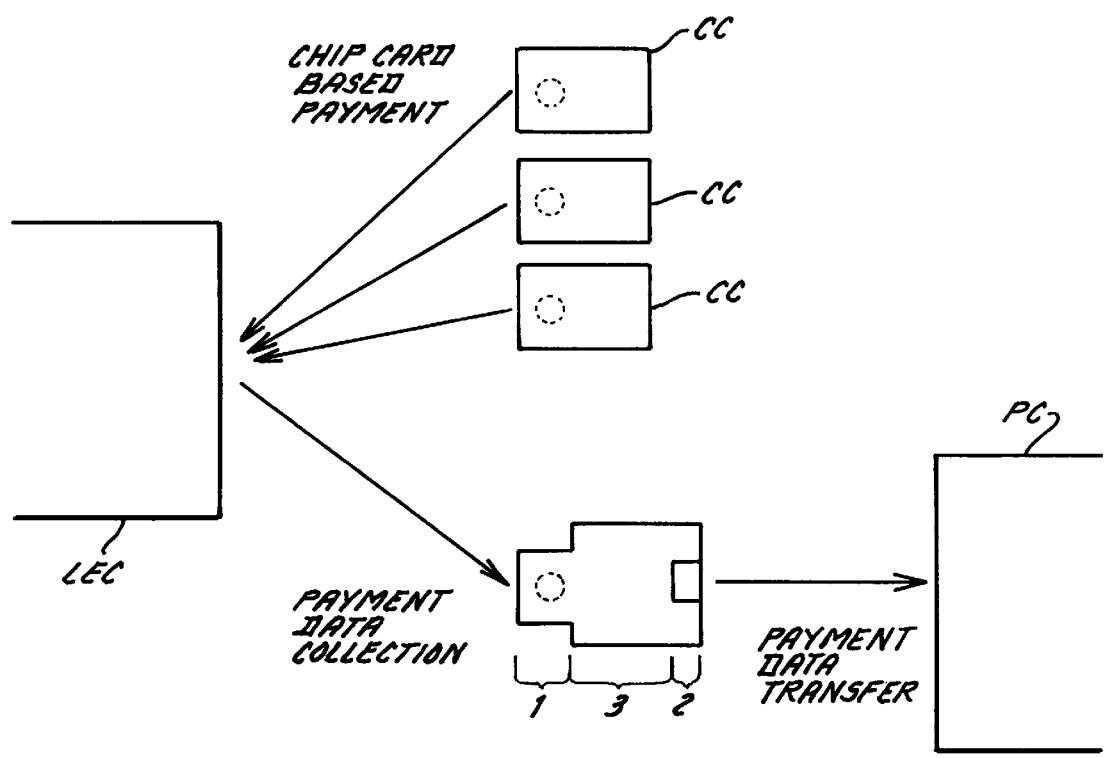
FIG. 4 shows an exemplary collection method according to the invention.

The transaction terminals (or card readers) have ISO type contacts designed to be in contact with chip cards to exchange information with the cards that are connected to them.

Typically, according to current standards, the credit card type chip cards have a connector with eight plane contacts that are flush on a main face of the card. These contacts have the following functions:

VCC and VPP=supply and programming voltage

VSS=ground

CLK=clock

I/O=data

RST, FUSES, PROG=commands.

The ISO 7816 standard for example defines the shapes and positions of these contacts. The chip card has dimensions (with sides of about 5×8 cm) very similar to those of the memory card, and it has a small thickness (in the range of one millimeter).

FIG. 1 shows an exemplary embodiment of the information collection system according to the invention. The information collection system is used to collect payment data from a payment terminal in the form of a card reader LEC after the payment terminal receives from one or more chip cards CC (see FIG. 4);

This system takes the form of a card having three parts:

- a part 1 that has a format equivalent to that of a chip card and possesses contacts 10 (ISO type contacts) on one of its faces so that it can be inserted into a card reader and so that the contacts set up the connections with the circuits of the card reader. More generally, the contacts 10 enable a serial transmission of information data;
- a part 2 that has an interface circuit enabling a parallel transmission of information data. This interface circuit comprises a connector 20. For example, this connector has 68 pins as in the case of a PCMCIA (Personal computer Memory Card International Association) connector;
- a part 3 that has circuits interconnecting the contacts 10 and connector 20. These circuits enable a series/parallel conversion of information. According to the example of FIG. 2, these circuits comprise:
  - a memory 5 designed to record the information coming from the card reader;

a microprocessor 4 to manage the transmission of information and, in general, to manage the operation of the system;

a power supply (battery) 8;

a clock 6;

a security microprocessor 7 to ensure the security of the system.

When a system of this kind is plugged into a card reader (FIG.4), its contacts 10 ensure a connection between the reader and the data collection system. Under the control of the control microprocessor 4 and the security microprocessor 7, a serial transmission of information data is carried out from the reader to the memory 5. The memory 5 therefore stores the data collected from the card reader as the data is collected until all of the data for a given collection transaction is collected, such that all of the data is stored in the memory before retransmission of the data begins. A given collection transaction starts when the collection system is plugged into the card reader and is complete when the collection system is removed from the card reader. The information elements on the transactions carried out in this reader are thus "emptied" into the memory 5.

Thereafter, the collection system can be connected by its connector 20 to a microcomputer (such as a PC type personal computer) or to a bigger information-processing system (FIG. 4).

The collection system is connected to a microcomputer like a removable memory card known in the prior art. Memory cards of this kind are mainly mass storage cards for portable computers. They could, in the future, replace diskettes and other magnetic type mass storage means. They can be used as mass storage units with a capacity as great as that of magnetic diskettes (in the range of one million bytes). Their space requirement is not greater (they have the credit card format with a thickness of 3 to 5 millimeters). They can be accessed much faster (several thousands of times faster).

Mass storage cards, which are sometimes still called PC-cards, comprise several memory chips and a connector (a 68-pin female connector according to the PCMCIA standard by the "Personal Computer Memory Card International Association", 1030B East Duane Avenue, Sunnyvale, Calif.). The card can be plugged to a corresponding (male) connector of the microcomputer. The connections are such that the memory can be addressed by a parallel input-output port of the PC, either as if the memory were a magnetic mass storage unit or as if it were an extension of the read/write memory of the microcomputer.

The term mass storage card is generally understood to mean a card comprising several integrated circuit chips and a multiple-pin connector at the end of the card. Typically, the PCMCIA standard defines such cards with 68 output contacts for card dimensions of approximately 5 centimeters by 8 centimeters and a thickness of about 3 to 5 millimeters. It is therefore an essentially planar card having two main parallel faces.

Under these conditions the collection system according to the invention can be connected by its connector 20 to a microcomputer (or other information-processing system) to carry out the parallel transfer of the information contained in its memory 5 and previously collected in the card readers.

FIG. 2 is a diagram of the collection system according to the invention.

In the left-hand part of FIG. 3, there is the part 1 similar to a chip card with its connection zones 10. This part 1 can be plugged into the reader LEC represented by dashes.

In the right-hand part of FIG. 2, there is the connector 20 which can be plugged into a connector CO of the microcomputer PC.

The contacts 10 are connected to the circuits of the part 3 by an ISO input/output interface circuit 11. The microprocessor 4 with its program memory 4' and the data memory 5 makes it possible to receive the data received by interface 11. Address, data and control buses enable the microprocessor 4 to manage the operations of collecting data and of writing in the memory 5.

The data information can thus be transferred in serial form from the reader LEC to the memory 5 where it is stored. Then, at the time of a connection of the system to the microcomputer PC, this information can be transferred by the input-output interface circuit 21 in parallel, and therefore at high speed, from the memory to the microcomputer PC.

The system of the invention thus comprises a device for connection to a reader and a serial transmission interface. It also comprises a connection interface for parallel transmission. Circuits make it possible to store the serial information and to retransmit it in parallel form.

More precisely, the invention has the following characteristics:

the interface 21 with the PCMCIA format makes it possible to directly connect the collection system to any computer equipped with a PCMCIA slot. The collection system thus behaves like a mass storage card when it is connected through this interface and the transfer of information towards the computer takes place as in the usual and known way for PCMCIA cards;

the interface 11 with the ISO format enables the direct connection of the collection system with any integrated circuit card reader (ISO card reader). The collection system then behaves like a chip card and the transfer of information to the collection system takes place as in the usual and known way for integrated circuit cards;

the collection system comprises a 68-pin female connector compatible with the PCMCIA standard to enable it to get connected into any PCMCIA slot of a computer;

The invention thus makes it possible to obtain a high speed of transfer of data through the use of the parallel port of the PCMCIA bus and, therefore, enables the transfer of a greater number of data elements in a limited period of time.

It also makes it possible to provide for the securing of the data through the use of a known security processor capable of implementing a security algorithm during the collecting of data through the serial interface (ISO) and during the transfer of this data through the parallel interface (PCMCIA). Practically, the transfers in one direction or the other could take place only after the implementation of a reciprocal procedure of authentication bringing into play a DES or RSA algorithm performed by the specialized processor 6. Such processors can be found in the market.

It furthermore enables an improvement in the ergonomical quality of the connection and a simplification of the system through direct connection to the PC (without any additional ISO card reader). It should be noted that the PCMCIA standard lays down great reliability of connection, equivalent to about 10000 insertions, and it is clear that it is much easier to plug in a PCMCIA card than to make an RS232 connection.

FIG. 3 shows an alternative embodiment of the collection system according to the invention.

According to this alternative embodiment, the connector 20 is a male connector. Moreover, the circuits of the part 3 comprise series/parallel interface circuits receiving information in serial form from the connector 10 of the part 1 and then transmitting it to the pins of the connector 20 in parallel form. There is furthermore provided a card 9 of the mass storage card type as described here above which, when equipped with a female connector 20', can be connected to the connector 20. This card is equipped with a data memory. The part 2 of the collection system in this embodiment includes the female connector 20' and the part 3 of the collection system includes the data memory. The card is therefore capable of receiving and storing the data information received on the connector 20' under the control of the microprocessor 7 of the part 3.

Then, this card 9 could be disconnected and connected to a microcomputer to transmit the contents of its memory to this microcomputer. In practice the microcomputer is equipped with a male connector to which the card 9 is plugged. This card is then perceived by the microcomputer as a mass storage unit is addressed by a parallel input-output port of the PC.or as an extension memory. The memory of the card.

The assembly shown in FIG. 3 thus fulfils the functions of the system of FIG. 2. On the other hand, it may bring greater flexibility of use while making it possible to change cards 9 at will. Thus, the system could be used more easily to collect information in readers of different types and be used in different types of applications.

We claim:

1. A portable information collection system for a card reader, comprising:
   (A) a first part, the first part being planar and having two main parallel sides, and the first part having connection zones that are flush with a surface of one of the two main sides to enable a serial transmission of information;
   (B) a second part, the second part comprising a connector enabling a parallel transmission of information;
   a third part, the third part comprising circuits to store data received in serial form by way of the connection zones from the card reader and to retransmit the data at request in parallel form on the connector, the circuits comprising memory that stores the data collected from the card reader as the data is collected until all of the data for a given collection transaction is collected, such that all of the data is stored in the memory before retransmission of the data begins.

2. An information collection system according to claim 1, wherein the circuits further comprise a microprocessor to control the information collection system, program memory, and a clock.

3. An information collection system according to claim 1, wherein the connection zones form an ISO connector.

4. An information collection system according to claim 1, wherein the information collection system is generally card-shaped.

5. An information collection system according to claim 1, wherein the connector is a PCMCIA female connector.

6. An information collection system according to claim 1,
   wherein the circuits further comprise a microprocessor,
   wherein the connector is a female connector,
   wherein the information collection system comprises an additional card,
   wherein the female connector is disposed on the additional card and a male connector is disposed on a remainder of the information collection system,
   wherein the memory is disposed on the additional card and is connected to the microprocessor by way of the female connector and the male connector, and
   wherein the information is stored in the memory under the control of the microprocessor and a program memory associated with the microprocessor.

7. An information collection system according to claim 1, wherein the connection zones are at most eight in number.

8. A system for collecting and transferring payment data pertaining to payment transactions, comprising:
   (A) a chip card, the chip card comprising a chip card connector having a plurality of connection zones, and the chip card being usable for conducting a payment transaction;
   (B) a payment terminal, the payment terminal comprising a card reader that is capable of receiving the chip card, the card reader comprising a card reader connector, the card reader connector being capable of cooperating with the chip card connector to establish a serial communication link between the payment terminal and the chip card;
   (C) an information processing system, the information processing system including a processing system connector; and
   (D) a portable information collection system comprising
      (1) a first part, the first part being planar and having two main parallel sides, one of the two main sides having a first collection system connector disposed thereon, the first collection system connector comprising a plurality of connection zones that are flush with the surface of the one main side, the first collection system connector being capable of cooperating with the card reader connector to establish a serial communication link between the information collection system and the card reader,
      (2) a second part, the second part comprising a second collection system connector, the second collection system connector being capable of establishing a parallel connection, and
      (3) a third part the third part comprising circuits to store data received in serial form by way of the connection zones from the card reader, and to retransmit the data at request in parallel form to the information processing system by way of the second collection system connector and the information processing system connector, the circuits comprising memory that stores the data collected from the card reader as the data is collected until all of the data for a given collection transaction is collected, such that all of the data is stored in the memory before retransmission of the data begins.

9. A system according to claim 8, wherein the circuits further comprise a microprocessor to control the system, program memory, and a clock.

10. A system according to claim 8, wherein the connection zones form an ISO connector.

11. A system according to claim 8, wherein the information collection system is generally card-shaped.

12. A system according to claim 8, wherein the connector is a PCMCIA female connector.

13. A system according to claim 8,
   wherein the circuits further comprise a microprocessor,
   wherein the second collection system connector is a female connector,
   wherein the information collection system comprises an additional card,
   wherein the second collection system connector is disposed on the additional card and a third collection system connector is disposed on a remainder of the information collection system, the third collection system connector being a male connector,
   wherein the memory is disposed on the additional card and is connected to the microprocessor by way of the second collection system connector and the third collection system connector, and wherein the information is stored in the memory under the control of the microprocessor and a program memory associated with the microprocessor.

14. A system according to claim 8, wherein the connection zones are at most eight in number.

15. A system according to claim 8, wherein second collection system connector is capable of cooperating with the information processing system connector to establish a parallel communication link between the information collection system and the information processing system.

16. A method of collecting and transferring payment data pertaining to payment transactions, the payment data being collected from a payment terminal and transferred to an information processing system, the method comprising the following steps, which are performed by a portable information collection system:

(A) establishing an electrical connection with the payment terminal, the connection being established by way of a plurality connection zones that are flush with a surface of the information collection system, the surface being a surface of one of two main parallel sides of a planar part of the information collection system; then (B) collecting payment data from the payment terminal while the electrical connection with the payment terminal is established; then (C) terminating the electrical connection with the payment terminal; then (D) storing the payment data in the information collection system while the information collection system is electrically isolated from both the payment terminal and the information processing system, the storing step being performed using an additional card that is connected a remainder of the information collection system by a female connector that is disposed on the card and a first male connector that is disposed on the remainder of the information collection system; then (E) establishing an electrical connection with the information processing system; and then (F) transferring the payment data to the information processing system while the electrical connection with the information processing system is established, wherein during the transferring step the card is disconnected from the remainder of the information collection system and is connected to the information processing system by way of the female connector and a second male connector that is associated with the information processing system.

17. A method according to claim 16, wherein the information collection system comprises a microprocessor that cooperates with other circuits of the information collection system to perform at least one of the steps (A)–(F).

18. A method according to claim 16, wherein the information collection system is generally card-shaped.

19. A method according to claim 16, wherein the connection zones are at most eight in number.

* * * * *